US012628254B2

(12) United States Patent
Slot et al.

(10) Patent No.: US 12,628,254 B2
(45) Date of Patent: May 12, 2026

(54) OPERATING MOSFET IN LINEAR MODE FOR MULTI-GROUP LEDS

(71) Applicant: eldoLAB Holding B.V., Son en Breugel (NL)

(72) Inventors: Machiel Slot, Son en Breugel (NL); Franciscus Bernardus Marie Van Horck, Son en Breugel (NL)

(73) Assignee: eldoLAB Holding B.V., Son en Breugel (NL)

( * ) Notice: Subject to any disclaimer, the term of this patent is extended or adjusted under 35 U.S.C. 154(b) by 119 days.

(21) Appl. No.: 18/729,731

(22) PCT Filed: Jan. 17, 2023

(86) PCT No.: PCT/EP2023/050995
§ 371 (c)(1),
(2) Date: Jul. 17, 2024

(87) PCT Pub. No.: WO2023/139058
PCT Pub. Date: Jul. 27, 2023

(65) Prior Publication Data
US 2025/0056693 A1 Feb. 13, 2025

(30) Foreign Application Priority Data
Jan. 18, 2022 (NL) ..................................... 2030587

(51) Int. Cl.
*H05B 45/30* (2020.01)
*H05B 45/395* (2020.01)
*H05B 45/46* (2020.01)

(52) U.S. Cl.
CPC .......... *H05B 45/46* (2020.01); *H05B 45/395* (2020.01)

(58) Field of Classification Search
CPC ...... H05B 45/10; H05B 45/30; H05B 45/395; H05B 45/46; H05B 47/10
See application file for complete search history.

(56) References Cited

U.S. PATENT DOCUMENTS

2016/0381756 A1* 12/2016 Grajcar ................. H05B 45/44 315/122
2017/0071038 A1 3/2017 Kangyo

FOREIGN PATENT DOCUMENTS

WO WO-2014108870 A2 * 7/2014 ........... H05B 47/185

OTHER PUBLICATIONS

Int'l Search Report (PCT/ISA/210) & Written Opinion (PCT/ISA/237) mailed on Feb. 13, 2023, by the European Patent Office in Int'l App. No. PCT/EP2023/050995. (10 pages).

(Continued)

*Primary Examiner* — Jimmy T Vu
(74) *Attorney, Agent, or Firm* — Sikand IP Law PLLC

(57) ABSTRACT

An LED driver configured to control a LED fixture comprising a plurality of LED groups is described, each LED group comprising at least one LED forming a series connection with a switch, wherein the plurality of LED groups are arranged in a parallel connection, the LED fixture further comprising a capacitor arranged in a parallel connection to the plurality of LED groups, the LED driver comprising:
- a power converter for converting an input power from a power source to a current which is provided to the plurality of LED groups;
- a control unit configured to control the power converter to provide the current to the plurality of LED groups, and wherein the control unit is further configured to
  - control an operation mode of the switch of the LED group between a nominal mode, wherein the switch operates in a closed nominal state or an open nominal state, and (Continued)

a transition mode, wherein the switch operates in a semi-closed state, wherein a gate to source voltage of the switch of the LED group is lower than the gate to source voltage of the respective switch when operated in the nominal mode, switch the current from flowing through a first LED group to flowing through a second LED group, wherein the first LED group has a higher forward voltage than the second LED group, by switching the switch of the first LED group in the open nominal state and the switch of the second LED group in the semi-closed state during a transient period.

13 Claims, 4 Drawing Sheets

(56) References Cited

OTHER PUBLICATIONS

International Search Report for priority application No. NL 2030587, dated Nov. 4, 2022, 8 pages.

* cited by examiner

OPERATING MOSFET IN LINEAR MODE FOR MULTI-GROUP LEDS

CROSS-REFERENCE TO RELATED APPLICATIONS

This application is a 371 Application of International Application No. PCT/EP2023/050995, filed Jan. 17, 2023, which claims priority to Netherlands Application No. 2030587, filed Jan. 18, 2022, the disclosures of which are incorporated herein by reference in their entirety for all purposes.

FIELD OF THE INVENTION

The technical field of the present invention relates to the operation mode of switches for multi-group LEDs, which may in particular be used for or be part of an LED driver.

BACKGROUND OF THE INVENTION

In general, an LED based product, e.g. a LED fixture, is driven by an LED driver. The LED fixture in general comprises multi-group LEDs, i.e. groups of LEDs which are arranged in a parallel connection. Based on the color characteristics of the multi-group LEDs applied, a color by each LED group can be generated. When the LED driver switches between the different LED groups, e.g. to generate a color pattern, only one particular LED group is powered on and the other LED groups are powered off. The switching on/off of a LED group occurs by controlling a switch, e.g. a MOSFET, which is placed in serial connection with the LED group.

Problems may arise when switching between two LED groups, wherein the forward voltage of each LED group is different. When switching from a LED group with a higher forward voltage to another LED group with a lower forward voltage, the LED driver experiences an unwanted peak-current, which may damage the switched LED group.

SUMMARY OF THE INVENTION

It is an object of the present invention to provide an improved LED driver, in particular being less prone to peak-currents, or at least to provide an alternative for known solutions.

This object is achieved by providing an LED driver configured to control a LED fixture comprising a plurality of LED groups, each LED group comprising at least one LED forming a series connection with a switch, wherein the plurality of LED groups are arranged in a parallel connection, the LED fixture further comprising a capacitor arranged in a parallel connection to the plurality of LED groups, the LED driver comprising:

- a power converter for converting an input power from a power source to a current which is provided to the plurality of LED groups;
- a control unit configured to control the power converter, as such the power converter provides current to plurality of LED groups, and wherein the control unit is further configured to
  - control the operation mode of the switch of the LED group between a nominal mode, wherein the switch operates in a closed nominal state or an open nominal state, and
    - a transition mode, wherein the switch operates in a semi-closed state, wherein the gate to source voltage of the switch of the LED group is lower than the gate to source voltage of the respective switch when operated in the nominal mode,
  - switch the current from flowing through a first LED group to flowing through a second LED group, wherein the first LED group has a higher forward voltage than the second LED group, by switching the switch of the first LED group in the open nominal state and the switch of the second LED group in the semi-closed state during a transient period.

In accordance with the present invention, an LED driver is, in general, applied for powering an LED fixture. The LED fixture comprises a plurality of LED groups. Each LED group comprises at least one LED forming a series connection with a switch. The switch may be any kind of suitable switch, e.g. a MOSFET such as a Si MOSFET, a GaN MOSFET, or a Sic MOSFET, or a bipolar transistor. An LED group may e.g. comprise one or more LED(s), arranged in series and/or parallel to each other. The plurality of LED groups, or also defined as multi-group LEDs, are arranged in a parallel connection. For example, the multi-group LEDs may comprise a first LED group including one red LED, a second LED group including one blue LED and one green LED and a third LED group including one white LED. The different LED groups may e.g. be adapted to emit light with the same or different colour, temperature and/or intensity. Further, the LED fixture comprises a capacitor arranged in a parallel connection to the plurality of LED groups. Such a capacitor is applied in order to reduce a high frequency which may occur on the current supplied to the LED groups otherwise.

The LED driver is adapted to be powered by a single main power source. The LED driver comprises a power converter, e.g. an AC/DC converter, adapted to convert an input power provided by the power source to a current which is provided to the plurality of LED groups. The power converter may e.g. comprise a buck/boost converter, a flyback converter, a power factor corrector (PFC) flyback converter, or another PFC-converter such as a PFC boost converter or an LLC converter.

A control unit is configured to control the power converter, as such the power converter provides current to plurality of LED groups. The control unit may comprise any type of control unit, including e.g. analogue control electronics, digital control electronics, such as a micro controller, microprocessor, or any other suitable control device such as a Field Programmable Gate Array (FPGA), a programmable logic device (PLD), discrete logic electronics etc.

The current is provided alternately between the plurality of LED groups. Hence, during operation only one LED group is powered on, while the other LED groups are shut down. The control unit is configured to control the switch of each LED group for switching between the different LED groups. The control unit can e.g. be adapted to control the switch of each LED group by providing a voltage or current to the switch, e.g. wherein a voltage or current above a predetermined threshold results in the switch being on or off. When a current is supplied to a particular LED group, a forward voltage across the LED group is generated. Generally, the forward voltage associated with a LED group is different compared to other LED groups. Thus, each LED group has its unique forward voltage. Resuming the above example, wherein the multi-group LEDs comprise three LED groups. The first LED group including one red LED has the lowest forward voltage of the LED groups. The second LED group including one blue LED and one green LED has the highest forward voltage. The forward voltage of the third LED group is between the forward voltage of the other two LED groups.

When the power converter provides a current to the LED fixture, the LEDs of the LED group, e.g. a first LED group, which is switched on by the control unit light up and the capacitor arranged in parallel connection to the LED groups is being charged. The charging of the capacitor imposes a capacitor voltage across the capacitor. After providing the current to the first LED group, the first LED group is switched off and a second LED group is switched on by the control unit. Suppose that the first LED group has a higher forward voltage relative to the forward voltage of the second LED group, an extra current will flow through the second LED group when the switching occurs. The extra current originates from the discharging of the capacitor. This extra current induces a peak current through the second LED group, which could be detrimental to the lifetime or operating characteristics of the LEDs of the second LED group. Applied to the earlier example, switching from the second or third LED group to the first LED group leads to an unwanted peak current through the red LED. Hence, the first LED group is sensitive to the peak current.

The control unit of the LED driver according to the invention is configured to control the operation mode of the switch of the LED group between a nominal mode and a transition mode. In the nominal mode, the switch operates in a closed nominal state or an open nominal state. Typically, in the nominal mode the applied (nominal) current can continuously flow through an LED and which causes the LED to operate at a desired operating temperature or within a certain temperature range, so as to ensure a certain desired lifetime of the LED, e.g. expressed in illumination hours. In the closed nominal state, the switch associated to the LED group is closed such that the nominal current flows through the LED group. The LED group is thus switched on. In the open nominal state, the switch of the LED group is open such that no (nominal) current flows through the LED group. The LED group is thus switched off. In the transition mode, the switch operates in a semi-closed state, wherein the gate to source voltage of the switch of the LED group is lower than the gate to source voltage of the respective switch when operated in the closed nominal mode. For example, the nominal value of the gate to source voltage in the closed nominal mode may be set at 5 V, while the gate to source voltage may be decreased to e.g. 1.5 V when the switch operates in the semi-closed state.

Within the meaning of the present invention, gate to source voltage of a switch may also be referred to as the gate-source voltage or $V_{GS}$ of the switch.

The control unit is further configured to switch the current from flowing through a first LED group to flowing through a second LED group, wherein the first LED group has a higher forward voltage than the second LED group, by switching the switch of the first LED group in the open nominal state and the switch of the second LED group in the semi-closed state during a transient period. The transient period is for example between 1-10 microseconds, preferably between 1-5 microseconds, more preferably between 1-3 microseconds. During this transient period, the switch of the second LED group temporary behaves like a resistor with a finite electrical resistance. This ensures that the flow of current through the second LED group is limited during the transient period. Consequently, the peak current is mitigated, or at least reduced, when switching from the first LED group to the second LED group.

After the transient period, the control unit controls the switch of the second LED group by switching the switch from the semi-closed state to the closed nominal state. The changing of the operation mode of the switch can be accomplished by increasing the gate to source voltage of the switch of the second LED group to the nominal value when switching from the semi-closed state to the closed nominal state.

In an embodiment, the LED driver according to the invention further comprises a first resistor. The first resistor comprises an input connectable to the control unit and an output connectable to the gate of the switch of the second LED group to arrange the first resistor in a serial connection with the gate of the switch of the second LED group. When the control unit is connected to the input of the first resistor, the control unit may transmit a control signal to the first resistor. The control signal may e.g. be represent a control voltage which is applied to the input of the first resistor. The control voltage may e.g. be 5V. When the output of the first resistor is connected to the gate of the switch of the second LED group, the control unit transmits the control signal to the input of the first resistor. As a result, a voltage is applied across the first resistor, resulting in the gate to source voltage of the switch to be lower than the applied control voltage of 5 V. Because the gate to source voltage is thus lower than the nominal gate to source voltage, e.g. 5 V, for operating in the closed nominal mode, the switch of the second LED group will operate in the transition mode by the control unit. The switch of the second LED group remains in the transition mode during the transient period. During the transient period, the voltage at the output of the first resistor builds up due to the flow of current through the first resistor, such that the gate to source voltage of the switch of the second LED group steadily increases towards the nominal value, e.g. 5 V. After the transient period, the gate to source voltage of the switch reaches the nominal value, wherein the switch of the second LED group is switched from the semi-closed state to the nominal closed state.

The combination of the first resistor and the gate capacitance of the switch will cause a $1^{st}$ order RC response to the application of a control signal from the control unit. As such, when a control signal, e.g. 5V is applied to the input of the first resistor, the switch will go through a transient period before reaching the nominal closed state. When applying a typical value of 100 pF for the gate capacitance and a value of 10 kΩ for the first resistor, it can be shown that this will result in a transient period when a switch is switched from an off state or open state to an on state or closed state. During said transient period, the switch thus acts as a resistor rather than as a short circuit, thus limiting the current through the second LED group. Based on e.g. datasheets of the applied switch, one can evaluate the resistance value of the switch, i.e. the $R_{DS}$ resistance, as a function of the gate to source voltage $V_{GS}$ of the switch.

In an embodiment of the present invention, the control signal from the control unit as applied to the first resistor can be a pulsed signal, e.g. a PWM signal, rather than a continuous signal. In such embodiment, the control signal may comprise a plurality of pulses during a transient period, e.g. a transient period of a few μsec. The pulsed signal as applied enables the application of a controlled Gate to Source voltage for the switch, thus controlling the resistance value of the switch, and thus controlling the current through the switch. In such embodiment, control of the current through the switch can be reached by controlling the frequency of the pulsed signal and/or the duty cycle of the pulsed signal.

In an embodiment, in order to further control the transient period, the control unit may be configured to adjust the control voltage, e.g. apply a reduced control voltage at the start of the transient period.

In a further embodiment, the LED driver according to the invention further comprises a first resistor switch which is arranged in a parallel connection with the first resistor. The first resistor switch may e.g. be a MOSFET. The control unit is configured to control the first resistor switch by switching the first resistor switch on, i.e. the first resistor switch is closed, or off, i.e. the first resistor switch is open. When the first resistor switch is switched open by the control unit, the first resistor is arranged in a serial connection with the gate of the switch of the second LED group.

The first resistor switch associated with a particular LED group will be switched open by the control unit, when the switched on LED group has a lower forward voltage than another LED group which is switched off. On the contrary, the first resistor switch associated with a particular LED group will be switched on by the control unit, when the switched on LED has a higher forward voltage than another LED group which is switched off. In the latter situation, no peak current problem arises due to the higher forward voltage, whereby it is not required to decrease the gate to source voltage temporary during the transient period. An advantage of using the first resistor switch is thus that the control unit is configured of controlling the gate to source voltage of the LED group that is switched on. In an embodiment, the control unit comprises a memory for storing configuration data of the plurality of LED groups of the LED fixture. The configuration data includes the (nominal) forward voltage of each LED group. The forward voltage data enables the control unit to decide whether the first resistor switch associated with the LED group that is switched on, needs to be switched on or off.

In another embodiment, the LED driver according to the invention comprises a second resistor. The second resistor is arrangeable in a serial connection with the LED fixture of the LED driver. When switching the current from flowing through a first LED group to flowing through a second LED group, wherein the first LED group has a higher forward voltage than the second LED group, the current also flows through the second resistor arranged in series with the LED fixture. This current will result in a voltage drop across the second resistor. Due to this additional voltage drop across the second resistor, the current through the second LED group will be limited.

In a further embodiment, the LED driver according to the invention further comprises a second resistor switch which is arranged in a parallel connection with the second resistor. The second resistor switch may e.g. be a MOSFET. The control unit is configured to control the second resistor switch. For example, the control unit may transmit a control signal to the second resistor switch, wherein the control signal results in the second resistor switch being on or off. When the second resistor switch is switched open by the control unit, the second resistor is arranged in a serial connection with the LED fixture of the LED driver.

In an embodiment, the control unit comprises a memory for storing configuration data of the plurality of LED groups of the LED fixture. The configuration data includes the (nominal) forward voltage of each LED group. The forward voltage data enables the control unit to decide whether the second resistor switch needs to be switched on or off based on the particular LED group that is switched on.

In an embodiment of the present invention, a LED system is provided, the LED system comprises the LED driver according to the present invention and a LED fixture comprising a plurality of LED groups. Each LED group comprises at least one LED forming a series connection with a switch, wherein the plurality of LED groups are arranged in a parallel connection. The LED fixture further comprises a capacitor arranged in a parallel connection to the plurality of LED groups. The LED fixture further comprises a resistor arranged in a serial connection with the plurality of LED groups and a resistor switch arranged in a parallel connection with the resistor. The control unit of the LED driver is configured to control the resistor switch, e.g. by transmitting a control signal to the resistor switch. Controlling the resistor switch allows to control the current through the LED group, due to the voltage drop across the resistor.

For example, the control unit may transmit a control signal to the resistor switch, wherein the control signal results in the resistor switch being on or off. When the resistor switch is switched open by the control unit, the resistor is arranged in a serial connection with the LED fixture. The open state of the resistor switch enables the resistor to operate the switch of the switched on LED group in the transition mode. After the transient period, the control unit switches the parallel resistor switch to a closed (nominal) state, e.g. by again transmitting a control signal to the parallel resistor switch. In the closed state of the parallel resistor switch, the switch of the switched on LED group operates in the nominal closed state.

The invention further relates to a method of controlling a LED fixture comprising a plurality of LED groups. Each LED group comprises at least one LED forming a series connection with a switch. The plurality of LED groups are arranged in a parallel connection. The LED fixture further comprises a capacitor arranged in a parallel connection to the plurality of LED groups. The method comprises the steps of:

- controlling the operation mode of the switch of the LED group between a nominal mode, wherein the switch operates in a closed nominal state or an open nominal state, and
  - a transition mode, wherein the gate to source voltage of the switch of the LED group is lower than the gate to source voltage of the respective switch when operated in the closed nominal state,
- switching the current from flowing through a first LED group to flowing through a second LED group, wherein the first LED group has a higher forward voltage than the second LED group, by switching the switch of the first LED group in the open nominal state and the switch of the second LED group in the transition mode during a transient period.

BRIEF DESCRIPTION OF THE DRAWINGS

The invention will be described below with reference to the figures. These figures serve as examples to illustrate the invention and will not be construed as limiting the scope of the claims. In the different figures, like features are indicated by the like reference numerals. In the figures:

DETAILED DESCRIPTION OF THE INVENTION

Figure 1:
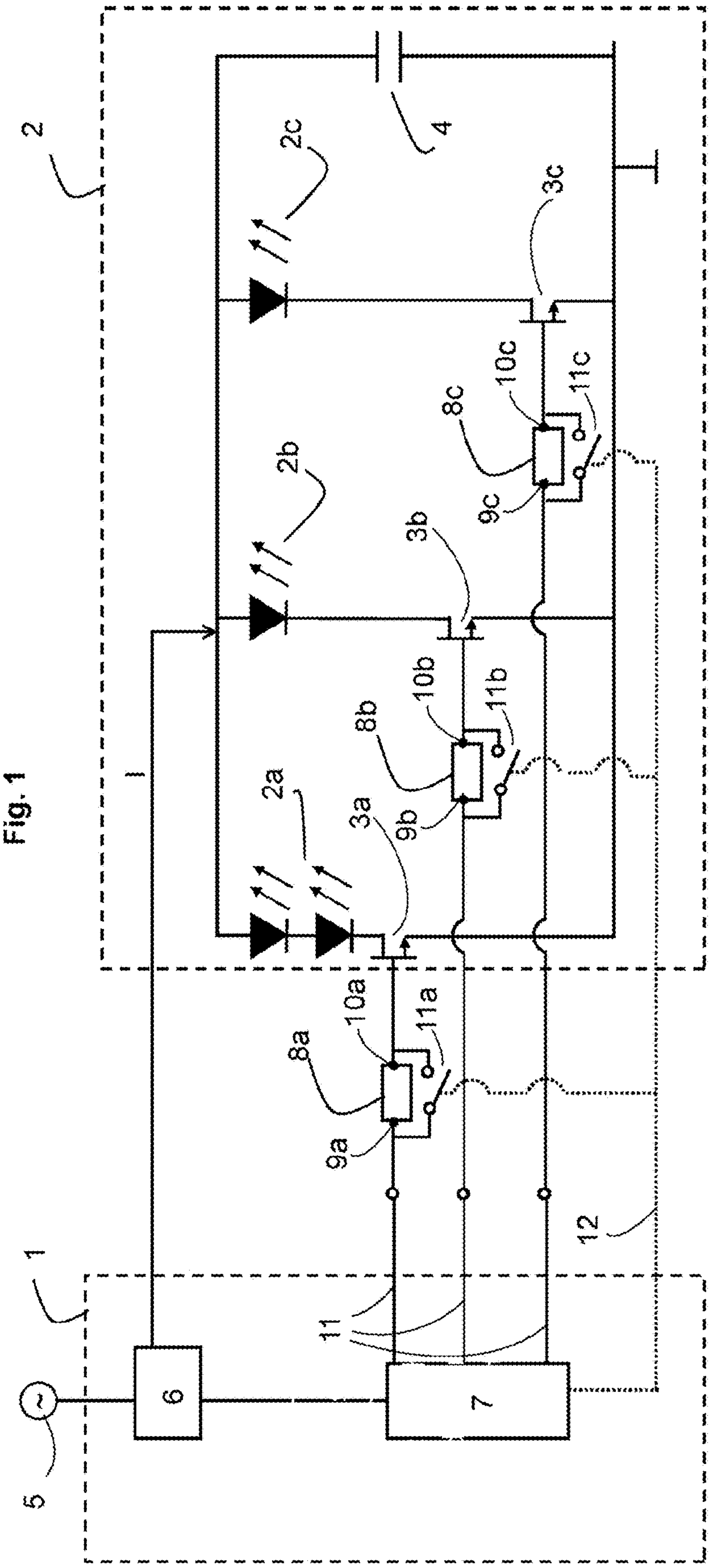
FIG. 1: Schematically illustrates a first embodiment of the invention.

FIG. 1 schematically illustrates a first embodiment of the invention. The invention relates to a LED driver 1. The LED driver 1 controls a LED fixture 2 comprising a plurality of LED groups. The plurality of LED groups are arranged in a parallel connection. Each LED group may comprise any suitable number of LEDs arranged in series or parallel. In FIG. 1, the LED fixture 2 comprises three LED groups: a first LED group 2*a* comprising two LEDs, a second LED group 2*b* comprising a single LED and a third LED group 2*c* comprising a single LED. The LED(s) of each LED group form a series connection with a switch 3*a*, 3*b*, 3*c*. In the shown example, the switch 3*a*, 3*b*, 3*c* of each LED group is a MOSFET, but other types of switches can be used. The LED fixture 2 further comprises a capacitor 4 arranged in a parallel connection to the plurality of LED groups 2*a*, 2*b*, 2*c*.

The LED driver 1 is powered by a main power source 5, which in this case is a mains connection, e.g. supplying 230 V or 120V/277V at 50 Hz or 60 Hz. The LED driver 1 comprises a power converter 6, e.g. an AC/DC converter, adapted to convert an input power provided by the power source 5 to a (supply) current I which is provided to the plurality of LED groups to emit light. Alternatively, the LED driver may be configured to operate in a voltage mode and provide a supply voltage to the plurality of LEDs. The power converter 6 may e.g. comprise a buck/boost converter, a flyback converter, a power factor corrector (PFC) flyback converter, or another PFC-converter such as a PFC boost converter or a resonant converter such as an LLC or LCC converter.

The LED driver 1 further comprises a control unit 7. The control unit 7 is configured to control the power converter 6, as such the power converter 6 provides current to the plurality of LED groups 2*a*, 2*b*, 2*c*. The control unit 7 may comprise any type of control unit, including e.g. analogue control electronics, digital control electronics, such as a micro controller, microprocessor, or any other suitable control device such as a Field Programmable Gate Array (FPGA), a programmable logic device (PLD), discrete logic electronics etc.

The control unit 7 can as such control the plurality of LED groups 2*a*, 2*b*, 2*c* that the current is provided alternately between the plurality of LED groups 2*a*, 2*b*, 2*c*. Hence, during operation only one LED group is powered on, while the other LED groups are switched off. The control unit 7 is configured to control the switch 3*a*, 3*b*, 3*c* of each LED group for switching between the different LED groups 2*a*, 2*b*, 2*c*. The switching between the different LED groups may occur by means of applying suitable control signals 11 to the switches 3*a*, 3*b*, 3*c*. An LED group can be switched on when the control unit 7 is connected to a particular switch 3*a*, 3*b*, 3*c* of the LED group and is configured to control said switch. The control unit 7 is adapted to control the switch 3*a*, 3*b*, 3*c* of the LED group by providing a voltage or current to the switch 3*a*, 3*b*, 3*c*, e.g. wherein a voltage or current above a predetermined threshold results in the switch 3*a*, 3*b*, 3*c* being on or off. When a current is supplied to a switched on LED group 2*a*, 2*b*, 2*c*, a forward voltage across the LED group 2*a*, 2*b*, 2*c* is generated due to the current I supplied to the LED group.

Suppose that the first LED group 2*a* is switched on and the second 2*b* and third 2*c* LED group are switched off by the control unit 7. When the power converter 6 provides a current to the LED fixture 2, the LED of the first LED group 2*a* lights up. In addition, the capacitor 4 arranged in parallel connection to the LED groups 2*a*, 2*b*, 2*c* is being charged. The charging of the capacitor 4 imposes a capacitor voltage across the capacitor 4. After providing the current to the first LED group 2*a*, the first LED group 2*a* is switched off and the second LED group 2*b* is switched on by the control unit 7. Imagine that the first LED group 2*a* has a higher forward voltage relative to the forward voltage of the second LED group 2*b*, an extra current will flow through the second LED group 2*b* when switching to the second LED group 2*b*. The extra current originates from the discharging of the capacitor 4. This extra current induces a peak current through the second LED group 2*b*, which could be detrimental to the lifetime or operating characteristics of the LED of the second LED group 2*b*.

To mitigate the above problem, the LED driver 1 comprises a first resistor 8*a*, 8*b*, 8*c* for each LED group 2*a*, 2*b*, 2*c*. Each first resistor 8*a*, 8*b*, 8*c* comprises an input 9*a*, 9*b*, 9*c* and an output 10*a*, 10*b*, 10*c*. The input 9*a*, 9*b*, 9*c* of the first resistor is connectable to the control unit 7 and the output 10*a*, 10*b*, 10*c* is connectable to the gate of the switch 3*a*, 3*b*, 3*c* of the respective LED group to arrange the first resistor 8*a*, 8*b*, 8*c* in a serial connection with the gate of the switch 3*a*, 3*b*, 3*c* of the respective LED group. When the control unit 7 is connected to the input 9*a*, 9*b*, 9*c* of the first resistor 8*a*, 8*b*, 8*c*, the control unit 7 may transmit a control signal 11 to the first resistor 8*a*, 8*b*, 8*c*. The control signal 11 may e.g. be represent a control voltage which is applied to the input 9*a*, 9*b*, 9*c* of the first resistor. The control voltage may e.g. be 5 V. When the output 10*a*, 10*b*, 10*c* of the first resistor is connected to the gate of the switch 3*a*, 3*b*, 3*c* of the respective LED group, the control unit 7 transmits the control signal 11 to the input 9*a*, 9*b*, 9*c* of the first resistor. As a result, a voltage is applied across the first resistor 8*a*, 8*b*, 8*c*, wherein the gate to source voltage of the switch 3*a*, 3*b*, 3*c* decreases. Because the gate to source voltage is decreased, the switch 3*a*, 3*b*, 3*c* of the respective LED group is switched in a transition mode by the control unit 7. In the transition mode, the switch 3*a*, 3*b*, 3*c* operates in a semi-closed state, wherein the gate to source voltage of the switch 3*a*, 3*b*, 3*c* of the LED group is lower than the gate to source voltage of the respective switch when operated in a nominal mode. In the nominal mode, the switch 3*a*, 3*b*, 3*c* operates in a closed nominal state or an open nominal state.

The switch 3*a*, 3*b*, 3*c* of the respective LED group remains in the transition mode during a transient period. The transient period is for example between 1-10 microseconds, preferably between 1-5 microseconds, more preferably between 1-3 microseconds. During the transient period, the voltage at the output 10*a*, 10*b*, 10*c* of the first resistor builds up due to the flow of current through the first resistor 8*a*, 8*b*, 8*c*, such that the gate to source voltage of the switch 3*a*, 3*b*, 3*c* of the respective LED group steadily increases towards the nominal value, e.g. 5 V. After the transient period, the gate to source voltage of the switch 3*a*, 3*b*, 3*c* reaches the nominal value, wherein the switch 3*a*, 3*b*, 3*c* of the respective LED group is switched from the semi-closed state to the nominal closed state. In the shown example of FIG. 1, the control unit 7 switches the current from flowing through the first LED group 2*a* to flowing through the second LED group 2*b*, wherein the first LED group 2*a* has a higher forward voltage than the second LED group 2*b*. The control unit 7 switches simultaneously the switch 3*a* of the first LED group in the open nominal state and the switch 3*b* of the second LED group in the semi-closed state.

The LED driver 1 of FIG. 1 further comprises a first resistor switch 11*a*, 11*b*, 11*c* which is arranged in a parallel connection with the first resistor 8*a*, 8*b*, 8*c*. The first resistor switch 11*a*, 11*b*, 11*e* may e.g. be a MOSFET. The control unit 7 is configured to control the first resistor switch 11*a*, 11*b*, 11*c* by switching the first resistor switch 11*a*, 11*b*, 11*c* on, i.e. the first resistor switch 11*a*, 11*b*, 11*c* is closed, or off, i.e. the first resistor switch 11*a*, 11*b*, 11*c* is open. The control unit 7 can e.g. be adapted to control the first resistor switch 11*a*, 11*b*, 11*c* by providing a switch signal 12 representing a voltage or current to the first resistor switch 11*a*, 11*b*, 11*c*, e.g. wherein the voltage or current above a predetermined threshold results in the first resistor switch 11*a*, 11*b*, 11*c* being on or off. When the first resistor switch 11*a*, 11*b*, 11*c* is switched open by the control unit 7, the first resistor 8*a*, 8*b*, 8*c* is arranged in a serial connection with the gate of the switch 3*a*, 3*b*, 3*c* of the respective LED group.

The first resistor switch 11*a*, 11*b*, 11*e* associated with a particular LED group 2*a*, 2*b*, 2*c* will be switched open by the control unit 7, when the switched on LED group has a lower forward voltage than the LED group which is switched off. On the contrary, the first resistor switch 11*a*, 11*b*, 11*c* associated with a particular LED group 2*a*, 2*b*, 2*c* will be switched on by the control unit 7, when the switched on LED has a higher forward voltage than another LED group which is switched off. In the latter situation, no peak current problem arises due to the higher forward voltage, whereby it is not required to decrease the gate to source voltage temporary during the transient period.

In the shown example of FIG. 1, the control unit 7 may switch the current from flowing through the second LED group 2*b* to flowing through the first LED group 2*a*, wherein the first LED group 2*a* has a higher forward voltage than the second LED group 2*b*. The first resistor switch 11*a* associated with the first LED group 2*a* is switched on by the control unit 7 via the switch signal 12. Thereby, the first resistor 8*a* associated with the first LED group 2*a* is shorted.

An advantage of using the first resistor switch 11*a*, 11*b*, 11*c* is that the control unit 7 is configured of controlling the gate to source voltage of switch 3*a*, 3*b*, 3*c* of the LED group that is switched on. In an embodiment, the control unit 7 comprises a memory for storing configuration data of the plurality of LED groups 2*a*, 2*b*, 2*c* of the LED Fixture 2. The configuration data includes the (nominal) forward voltage of each LED group. The forward voltage data enables the control unit 7 to decide whether the first resistor switch 11*a*, 11*b*, 11*c* associated with the LED group 2*a*, 2*b*, 2*c* that is switched on, needs to be switched on or off.

Figure 2:
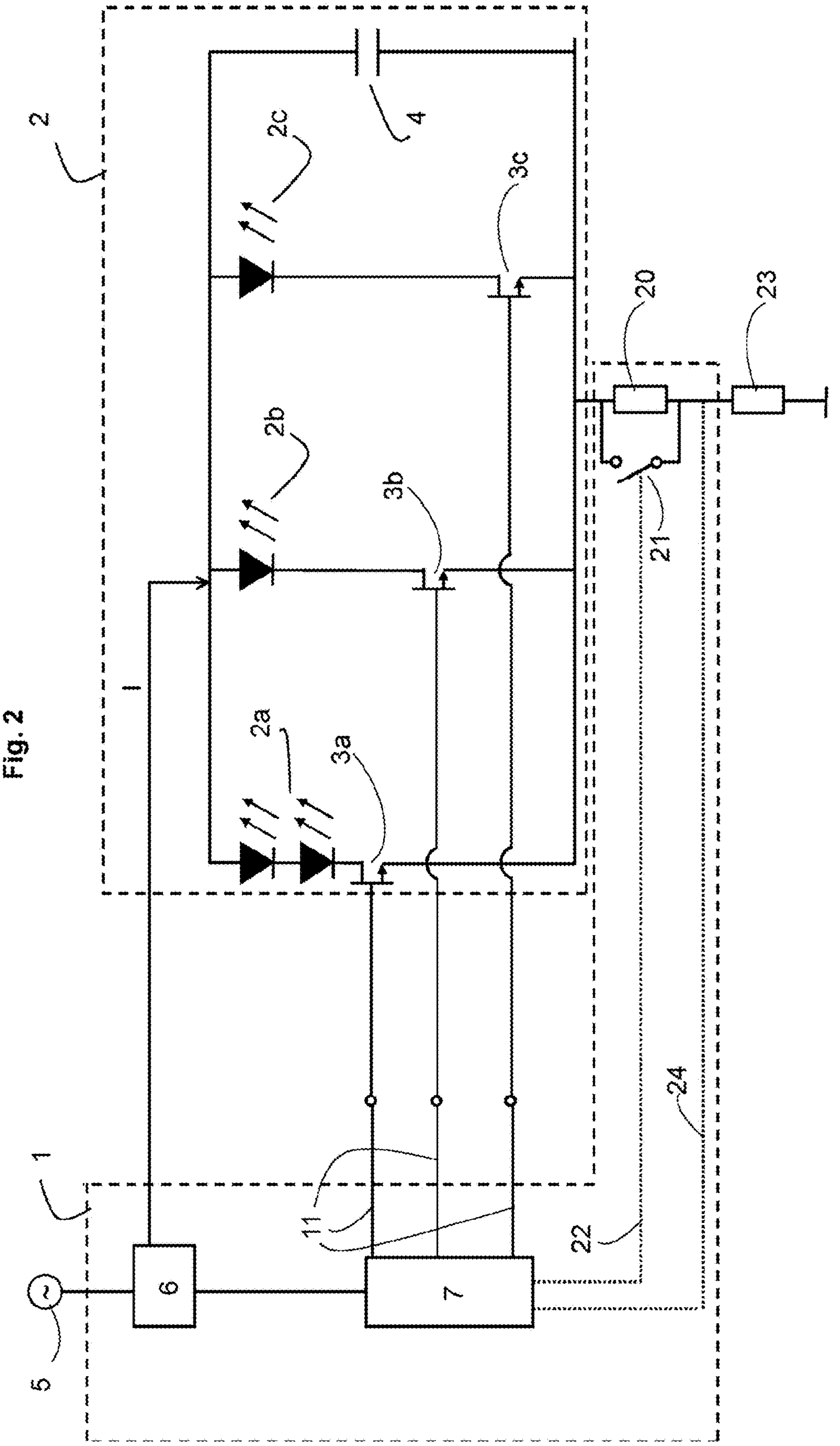
FIG. 2: Schematically illustrates a second embodiment of the invention.

FIG. 2 schematically illustrates a second embodiment similar to FIG. 1 of the LED driver 1 according to the invention to drive the plurality of LED groups 2*a*, 2*b*, 2*c* of the LED fixture 2. Instead of the first resistor and/or the first resistor switch for each LED group, the LED driver 1 of FIG. 2 comprises a second resistor 20. The second resistor 20 is arrangeable in a serial connection with the LED fixture 2 of the LED driver via a second resistor switch 21. The second resistor switch 21 is arranged in a parallel connection with the second resistor 20. The second resistor switch 21 may e.g. be a MOSFET.

The control unit 7 is configured to switch the second resistor switch 21. For example, the control unit 7 transmits a control signal 22 to the second resistor switch 21, wherein the control signal 22 results in the second resistor switch 21 being on or off. When the second resistor switch 21 is switched open by the control unit 7, the second resistor 20 is arranged in a serial connection with the LED fixture 2 of the LED driver. When the control unit 7 switches the current from flowing through the first LED group 2*a* to flowing through the second LED group 2*b*, wherein the first LED group 2*a* has a higher forward voltage than the second LED group 2*b*, the current also flows through the second resistor 20 arranged in series with the LED fixture 2. This current results in a voltage drop across the second resistor 20. The voltage drop changes the gate to source voltage of the switch 3*b* of the second LED group 2*b* to a lower gate to source voltage value. Suppose that the provided current by the LED driver 1 is set at 1 A and the resistance value of the second resistor 20 is 2 Ohm. Due to the voltage drop across the second resistor 20, the gate to source voltage of the switch 3*b* will decrease with 2 V, e.g. from 5 V tot 3 V. The decrease of the gate to source voltage causes the switch 3*b* of the second LED group to operate in the transition mode. After the transient period, the control unit 7 switches the second resistor switch 21 to a closed (nominal) state, e.g. by again transmitting a control signal 22 to the second resistor switch 21. Thereby, the second resistor 20 is shorted. The gate to source voltage of the switch 3*b* of the second LED group increases back to the nominal value, e.g. 5 V, which means that the switch 3*b* operates in the nominal closed state. Controlling the second resistor switch 21 allows the control unit 7 to control the gate to source voltage of the switch 3*a*, 3*b*, 3*c* of the switched on LED group.

In an embodiment, the current I through the plurality of LED groups 2*a*, 2*b*, 2*c* as provided by the LED driver 1 can be determined from a current measurement circuit 23. The current measurement circuit 23 may comprise a resistance element, which resistance element is placed in serial connection with the LED fixture 2. The voltage across the resistance element combined with the know resistance value from the resistance element thus enables to determine the value of the current through the plurality of LED groups 2*a*, 2*b*, 2*c*, which current value could be fed back 24 to the control unit 7 by the current measurement circuit 23. In this embodiment, the current feedback loop 24 gives an extra check on the provided current by actively measuring the provided current.

In an embodiment, the control unit 7 comprises a memory for storing configuration data of the plurality of LED groups 2*a*, 2*b*, 2*c* of the LED fixture 2. The configuration data includes the (nominal) forward voltage of each LED group. The forward voltage data enables the control unit 7 to decide whether the second resistor switch 21 needs to be switched on or off based on the particular LED group 2*a*, 2*b*, 2*c* that is switched on.

Figure 3:
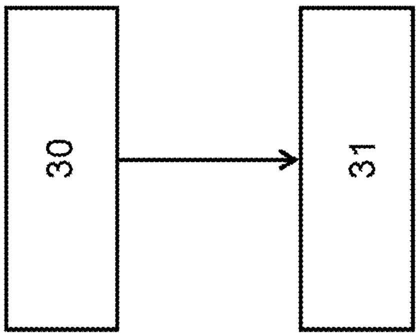
FIG. 3: Schematically illustrates an embodiment of a flow diagram of the method according the invention.

FIG. 3 schematically depicts a flow diagram of an embodiment of the method according to the invention for controlling an LED fixture comprising a plurality of LED groups. Each LED group comprises at least one LED forming a series connection with a switch, wherein the plurality of LED groups are arranged in a parallel connection. The LED fixture further comprises a capacitor arranged in a parallel connection to the plurality of LED groups. The method according to the invention comprises a first step 30 of controlling the operation mode of the switch of the LED group between a nominal mode and a transition mode. In the nominal mode, the switch operates in a closed nominal state or an open nominal state. In the the transition mode, the gate to source voltage of the switch of the LED group is lower than the gate to source voltage of the respective switch when operated in the closed nominal state.

Further, the method comprises a second step 31, switching the current from flowing through a first LED group to flowing through a second LED group. The first LED group has a higher forward voltage than the second LED group. When the switching step 31 occurs, the switch of the first LED group is switched in the open nominal state and the switch of the second LED group is switched in the transition mode during a transient period. The transient period is for example between 1-10 microseconds, preferably between 1-5 microseconds, more preferably between 1-3 microseconds. During this transient period, the switch of the second LED group temporary behaves like a resistor with a finite electrical resistance. This ensures that the flow of current through the second LED group is limited during the transient period. Consequently, a peak current is mitigated, or at least reduced, when switching from the first LED group to the second LED group.

After the transient period, the switch of the second LED group may be switched from the semi-closed state to the closed nominal state. The changing of the operation mode of the switch can be accomplished by increasing the gate to source voltage of the switch of the second LED group to the nominal value when switching from the semi-closed state to the closed nominal state.

Figure 4:
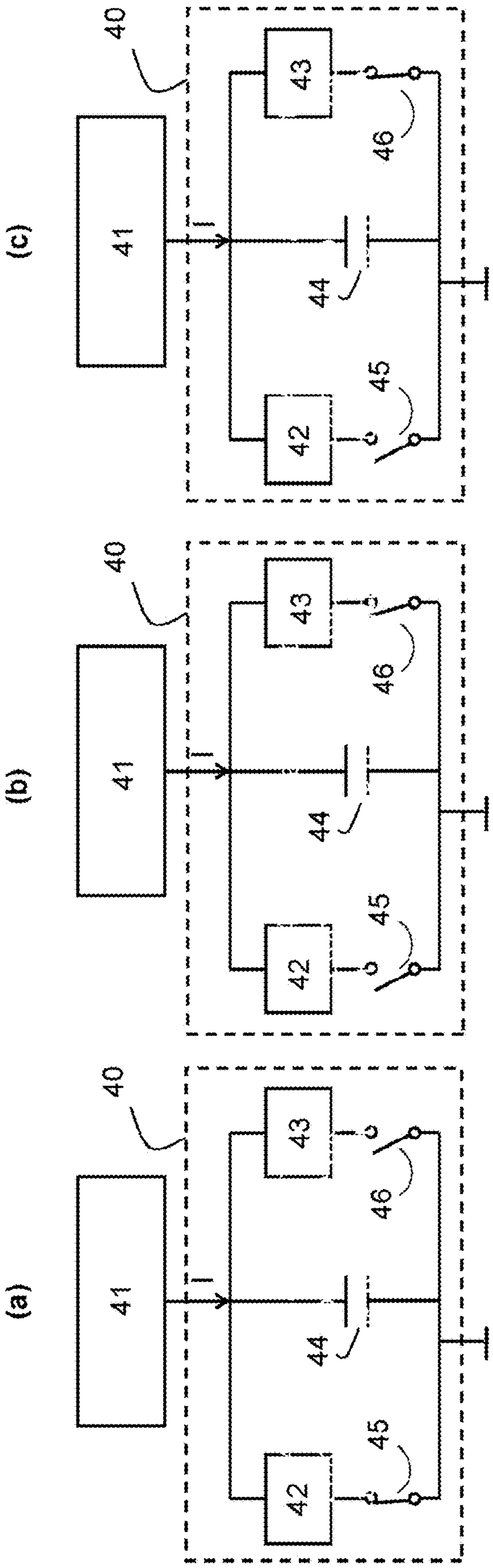
FIG. 4: schematically depicts an embodiment to illustrate the method according to the invention.

FIG. 4 schematically depicts an embodiment to illustrate the method according to the invention, wherein an LED fixture 40 comprising a plurality of LED groups is controlled by an LED driver 41. The LED driver 41 controls the LED fixture 40 by providing a current I. The LED driver 41 is also configured to provide a supply voltage to the LED fixture 40. In this embodiment, the LED fixture 40 comprises two LED groups arranged in a parallel connection: a first LED group 42 and a second LED group 43. Each LED group 42, 43 may comprise any suitable number of LEDs arranged in series or parallel. The LED fixture 40 further comprises a capacitor 44 arranged in a parallel connection to the two LED groups 42, 43. Each LED group 42, 43 forms a series connection with a switch, e.g. a MOSFET. The operation mode of the switch associated with LED group is controllable between a nominal mode and a transition mode. In the nominal mode, the switch operates in a closed nominal state or an open nominal state. In the transition mode, the gate to source voltage of the switch of the LED group is lower than the gate to source voltage of the respective switch when operated in the closed nominal state.

In situation (a), the switch 45 of the first LED group 42 is switched on and operates in the closed nominal mode. The switch 46 of the second LED group 43 is switched off and operates in the open nominal mode. The current I flows through the first LED group 42 and the capacitor 44. As a result, the first LED group 42 emits light and the capacitor is being charged.

In situation (b), the current I is switched from flowing through the first LED group 42 to flowing through the second LED group 43. The first LED group 42 has a higher forward voltage than the second LED group 43. As can be seen in situation (b) of FIG. 4, the switch 45 of the first LED group 42 is switched in the open nominal state and the switch 46 of the second LED group 43 is switched in the transition mode. The switch 46 of the second LED group 43 is not completely closed, i.e. semi-closed, during a transient period. During this transient period, the switch 46 of the second LED group 43 temporary behaves like a resistor with a finite electrical resistance. This ensures that the flow of current through the second LED group 43 is limited during the transient period. Consequently, a peak current is mitigated, or at least reduced, when switching from the first LED group 42 to the second LED group 43.

After the transient period, the switch 46 of the second LED group 43 is switched from the semi-closed state to the closed nominal state. This is visualised in situation (c) of FIG. 4. The changing of the operation mode of the switch can be accomplished by increasing the gate to source voltage of the switch 46 of the second LED group 43 to the nominal value when switching from the semi-closed state to the closed nominal state.

As required, detailed embodiments of the present invention have been described.

The various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" do not exclude the presence of more elements.

The invention claimed is:

1. An LED driver configured to control a LED fixture comprising a plurality of LED groups, each LED group comprising at least one LED forming a series connection with a switch, wherein the plurality of LED groups are arranged in a parallel connection, the LED fixture further comprising a capacitor arranged in a parallel connection to the plurality of LED groups, the LED driver comprising:

a power converter for converting an input power from a power source to a current which is provided to the plurality of LED groups;

a control unit configured to control the power converter to provide the current to the plurality of LED groups, and wherein the control unit is further configured to:

control an operation mode of the switch of the LED group between a nominal mode, wherein the switch operates in a closed nominal state or an open nominal state, and a transition mode, wherein the switch operates in a semi-closed state, wherein a gate to source voltage of the switch of the LED group is lower than the gate to source voltage of the respective switch when operated in the nominal mode, and switch the current from flowing through a first LED group to flowing through a second LED group, wherein the first LED group has a higher forward voltage than the second LED group, by switching the switch of the first LED group in the open nominal state and the switch of the second LED group in the semi-closed state during a transient period.

2. The LED driver according to claim 1, wherein the control unit is further configured to switch the switch of the second LED group in the closed nominal state after the transient period.

3. The LED driver according to claim 2, wherein the control unit is further configured to increase the gate to source voltage of the switch of the second LED group when switching from the semi-closed state to the closed nominal state after the transient period.

4. The LED driver according to claim 1, wherein the LED driver further comprises a first resistor comprising:

an input connectable to the control unit, and an output connectable to the gate of the switch of the second LED group to arrange the first resistor in a serial connection with the gate of the switch of the second LED group, wherein the gate to source voltage of the switch decreases when switching the switch of the second LED group in the transition mode by transmitting a control signal from the control unit to the input of the first resistor.

5. The LED driver according to claim 4, wherein the LED driver comprises a first resistor switch which is arranged in a parallel connection with the first resistor, wherein the control unit is configured to control the first resistor switch, wherein the first resistor is arranged in a serial connection with the gate of the switch of the second LED group when the first resistor switch is switched open by the control unit.

6. The LED driver according to claim 1, wherein the LED driver further comprises a second resistor which is arrangeable in a serial connection with the LED fixture of the LED driver.

7. The LED driver according to claim 6, wherein a second resistor switch is arranged in a parallel connection with the second resistor, wherein the control unit is configured to control the second resistor switch.

8. The LED driver according to claim 7, wherein the control unit is configured to control the second resistor switch to an open state during the transient period.

9. The LED driver according to claim 1, wherein the control unit is configured to simultaneously control the switch of the first LED group in the open nominal state and the switch of the second LED group in the transition mode during the transient period.

10. The LED driver according to claim 1, wherein the transient period is between 1-10 microseconds, preferably between 1-5 microseconds, more preferably between 1-3 microseconds.

11. The LED driver according to claim 1, wherein the control unit comprises configuration data of the plurality of LED groups of the LED fixture, wherein the configuration data includes the nominal forward voltage of each LED group.

12. An LED system comprising the LED driver according to claim 1 and a LED fixture comprising a plurality of LED groups, each LED group comprising at least one LED forming a series connection with a switch, wherein the plurality of LED groups are arranged in a parallel connection, the LED fixture further comprising a capacitor arranged in a parallel connection to the plurality of LED groups, and wherein the LED fixture further comprising a resistor arranged in a serial connection with the plurality of LED groups and a resistor switch arranged in a parallel connection with the resistor, wherein the control unit is configured to control the resistor switch.

13. A method of controlling a LED fixture comprising a plurality of LED groups, each LED group comprising at least one LED forming a series connection with a switch, wherein the plurality of LED groups are arranged in a parallel connection, the LED fixture further comprising a capacitor arranged in a parallel connection to the plurality of LED groups, the method comprising:

controlling the operation mode of the switch of the LED group between a nominal mode, wherein the switch operates in a closed nominal state or an open nominal state, and a transition mode, wherein the gate to source voltage of the switch of the LED group is lower than the gate to source voltage of the respective switch when operated in the closed nominal state, and switching the current from flowing through a first LED group to flowing through a second LED group, wherein the first LED group has a higher forward voltage than the second LED group, by switching the switch of the first LED group in the open nominal state and the switch of the second LED group in the transition mode during a transient period.

* * * * *